(12) United States Patent
Ryoo

(10) Patent No.: US 7,864,933 B2
(45) Date of Patent: Jan. 4, 2011

(54) SYSTEM AND METHOD FOR MANAGING PREPAID CARD

(75) Inventor: Chang Wan Ryoo, Seoul (KR)

(73) Assignee: Galaxia Communications Inc., Seoul (KR)

( * ) Notice: Subject to any disclaimer, the term of this patent is extended or adjusted under 35 U.S.C. 154(b) by 1211 days.

(21) Appl. No.: 11/483,922

(22) Filed: Jul. 10, 2006

(65) Prior Publication Data

US 2007/0071197 A1    Mar. 29, 2007

(30) Foreign Application Priority Data

Sep. 5, 2005    (KR) .................. 10-2005-0082217

(51) Int. Cl.
| H04M 15/00 | (2006.01) |
| H04M 11/00 | (2006.01) |
| G06K 5/00 | (2006.01) |
| G07F 19/00 | (2006.01) |
| G06Q 40/00 | (2006.01) |

(52) U.S. Cl. ............... 379/114.2; 379/93.12; 379/93.17; 235/380; 705/14.38

(58) Field of Classification Search ............... 379/90.01, 379/93.12, 93.17, 93.25, 114.15, 114.17, 379/114.19, 114.2, 144.01; 705/56, 58, 72, 705/14.37; 235/375, 379, 380, 381, 382, 235/383
See application file for complete search history.

(56) References Cited

U.S. PATENT DOCUMENTS

| 5,696,908 | A  | * | 12/1997 | Muehlberger et al. | .......... | 705/39 |
| 6,526,130 | B1 | * | 2/2003 | Paschini | .................. | 379/93.12 |
| 7,072,455 | B2 | * | 7/2006 | Diaz | ..................... | 379/144.01 |
| 2006/0078100 | A1 | * | 4/2006 | Risafi et al. | ............... | 379/114.2 |
| 2007/0090183 | A1 | * | 4/2007 | Hursta et al. | ................. | 235/380 |
| 2007/0187490 | A1 | * | 8/2007 | Feldman et al. | ............. | 235/380 |

FOREIGN PATENT DOCUMENTS

| KR | 20010000053 | 1/2001 |
| KR | 20030068226 | 8/2003 |

* cited by examiner

*Primary Examiner*—Binh K Tieu
(74) *Attorney, Agent, or Firm*—Marshall, Gerstein & Borun LLP

(57) ABSTRACT

A prepaid card management method and system which can comprehensively manage an issuance of personal identification numbers (PINs) of various affiliated prepaid card companies and even when each generation system of each PIN is different for each affiliated prepaid card company, can adaptably issue the PIN. A prepaid card management method and system according to the present invention can adaptably issue PINs of prepaid cards of various affiliated prepaid card companies by including an operation system to comprehensively manage a plurality of PIN issue systems.

15 Claims, 4 Drawing Sheets

FIG. 2

| AFFILIATED PREPAID CARD COMPANY | NETWORK ADDRESS |
|---|---|
| A | PIN ISSUE SYSTEM #1 (IP:130.36.1.86) |
| B | PIN ISSUE SYSTEM #2 (IP:130.36.0.99) |

FIG. 3 i)

| CARD IDENTIFIER | FACE VALUE IDENTIFIER | PIN |
|---|---|---|
| Dokdo | 5,000 | d48210010 |
|  | 10,000 | d48283010 |
|  | 20,000 | d53292052 |
| Hyodo | 100,000 | h20918920 |
|  | 200,000 | h22138790 |
|  | 300,000 | h38709876 | ii)

| CARD IDENTIFIER | FACE VALUE IDENTIFIER | PIN |
|---|---|---|
| Dokdo | 0 | d68231004 |
|  | 0 | d35213020 |
|  | 0 | d63125301 |
| Hyodo | 0 | h10931020 |
|  | 0 | h20428497 |
|  | 0 | h23500878 |

SYSTEM AND METHOD FOR MANAGING PREPAID CARD

CROSS-REFERENCE TO RELATED APPLICATION

This application claims the benefit of Korean Patent Application No. 10-2005-0082217, filed on Sep. 5, 2005,, in the Korean Intellectual Property Office, the disclosure of which is incorporated herein by reference.

BACKGROUND OF THE INVENTION

1. Field of the Invention

The present invention relates to a prepaid card management method and system which can comprehensively manage an issuance of personal identification numbers (PINs) in various affiliated prepaid card companies and even when each generation system of each PIN is different for each affiliated prepaid card company, can adjustably issue the PIN.

2. Description of Related Art

A prepaid card is generally utilized in a prepayment method when making a call. Also, the prepaid card may indicate a card which enables a user to receive a call service within a range of its balance by inputting a personal identification number (PIN), that is written on the prepaid card, via a communication terminal before or after inputting a telephone number that the user desires to connect to. In the present invention, the prepaid card includes any type of card which enables a user to utilize goods or services within a certain amount of money, such as a telephone card, an Internet game card, and a gift certificate.

The prepaid card described above is generally made of a plastic material and then, sold and distributed. In this instance, a predetermined strengthening process is required to prevent the prepaid card from being damaged in the distribution and a special process is also required to protect a card number which is written on a top surface of the prepaid card. Consequently, a manufacturing cost of the prepaid card increases.

As an improved example of issuing a prepaid card, Korean Patent Laid-Open Publication No. 2004-55806, (hereinafter, conventional art) discloses a 'prepaid card information generation system' which reads a type of a prepaid card and a redemption value of the prepaid card from a barcode and generates prepaid card information whose redemption value is identical to a paid amount. Namely, in the conventional art, the prepaid card information system generates prepaid card information in a prepaid card information generation unit, utilizing the type of the prepaid card and the redemption value of the prepaid card that was read by the barcode reader of a point of sales (POS) device, and transmits the generated prepaid card information to the POS device. In this instance, the prepaid card information generation unit is positioned in, e.g. a central management server while the POS device is positioned in a store. The transmitted prepaid card information is printed out on a type of paper including a card number, and provided to the user.

However, the configuration according to the conventional art may need to install an additional prepaid card information generation device associated with the generation of prepaid card information in the central management server. In this case, the configuration may become complicated and an installation cost may be increased. Also, in the conventional art, the prepaid card information is generated in the central management server. Also, since each card number generation system is different for each prepaid card company, in actuality the generated prepaid card information in the central management server may not be subsequently utilized. Accordingly, in the conventional art, a configuration which recognizes each different PIN generation system of each prepaid card company and controls a compatible card number to be issued is essentially required. However, until now, no widely recognized and optimal configuration has been embodied.

Accordingly, a prepaid card issue system which can secure an adaptable issuance of a PIN and reduce an installation cost for a generation system of the PIN by amalgamating each PIN issue system associated with each prepaid card company in charge of generation of the PIN, and comprehensively managing the each PIN issue system of the each prepaid card company in an operation system is required.

BRIEF SUMMARY

The present invention provides a prepaid card management method and system which can adaptably issue PINs of prepaid cards of various affiliated prepaid card companies by including an operation system to comprehensively manage a plurality of PIN issue systems.

The present invention also provides a prepaid card management method and system which can prevent any overlap between PIN generation systems by securing each PIN generation system of each prepaid card company and transmitting a card request signal to a PIN issue system associated with an affiliated prepaid card company receiving a purchase request from a user.

The present invention also provides a real-time prepaid card management method and system which can prevent an illegal utilization of a prepaid card by providing a user with a PIN issued from each prepaid card generation system according to the user's purchase request and activating only a normally issued PIN.

According to an aspect of the present invention, there is provided a prepaid card management method including: a central system receiving affiliated prepaid card company information, card type information, and amount information, from a POS terminal; the central system generating a card request signal which includes a transaction number in the information received from the POS terminal and providing the generated card request signal to a predetermined operation system; the operation system extracting the affiliated prepaid card company information from the information received from the central system, to identify a personal identification number (PIN) issue system associated with the prepaid card and transmit the card request signal to the identified PIN issue system according to a predetermined format; and the operation system transmitting PIN information, which includes a PIN received from the PIN issue system in response to the transmitted card request signal, to the POS terminal via the central system, wherein the PIN issue system generates the PIN information by retrieving the PIN corresponding to the card request signal, and transmits the generated PIN information to the operation system.

According to another aspect of the present invention, there is provided a prepaid card management method including: a central system receiving affiliated prepaid card company information, an individual card identification code, and recharging information from a POS terminal; the central system generating a card recharging request signal which includes a transaction number in the information received from the POS terminal, and providing the generated card recharging request signal to a predetermined operation system; the operation system extracting the affiliated prepaid card company information from the information received from the central system, to identify a PIN issue system associated with the prepaid card, and transmit the card recharging request signal to the identified PIN issue system according to a predetermined format; and the operation system transmitting a predetermined affirmative recharging message which is received from the PIN issue system in response to the transmitted card recharging request signal, to the POS terminal via the central system, wherein the PIN issue system retrieves the PIN corresponding to the card recharging request signal and increases balance information associated with the retrieved PIN by an amount corresponding to the recharging information.

BRIEF DESCRIPTION OF THE DRAWINGS

The above and/or other aspects and advantages of the present invention will become apparent and more readily appreciated from the following detailed description, taken in conjunction with the accompanying drawings of which:

FIG. 2 is a diagram illustrating network address information of a PIN issue system associated with an affiliated prepaid card company, which is managed in an operation system, as an example of issue of the PIN according to an embodiment of the present invention;

FIG. 3 is a diagram illustrating a PIN maintained in a memory, as another example of issue of the PIN according to an embodiment of the present invention.

DETAILED DESCRIPTION OF EMBODIMENTS

Figure 1:
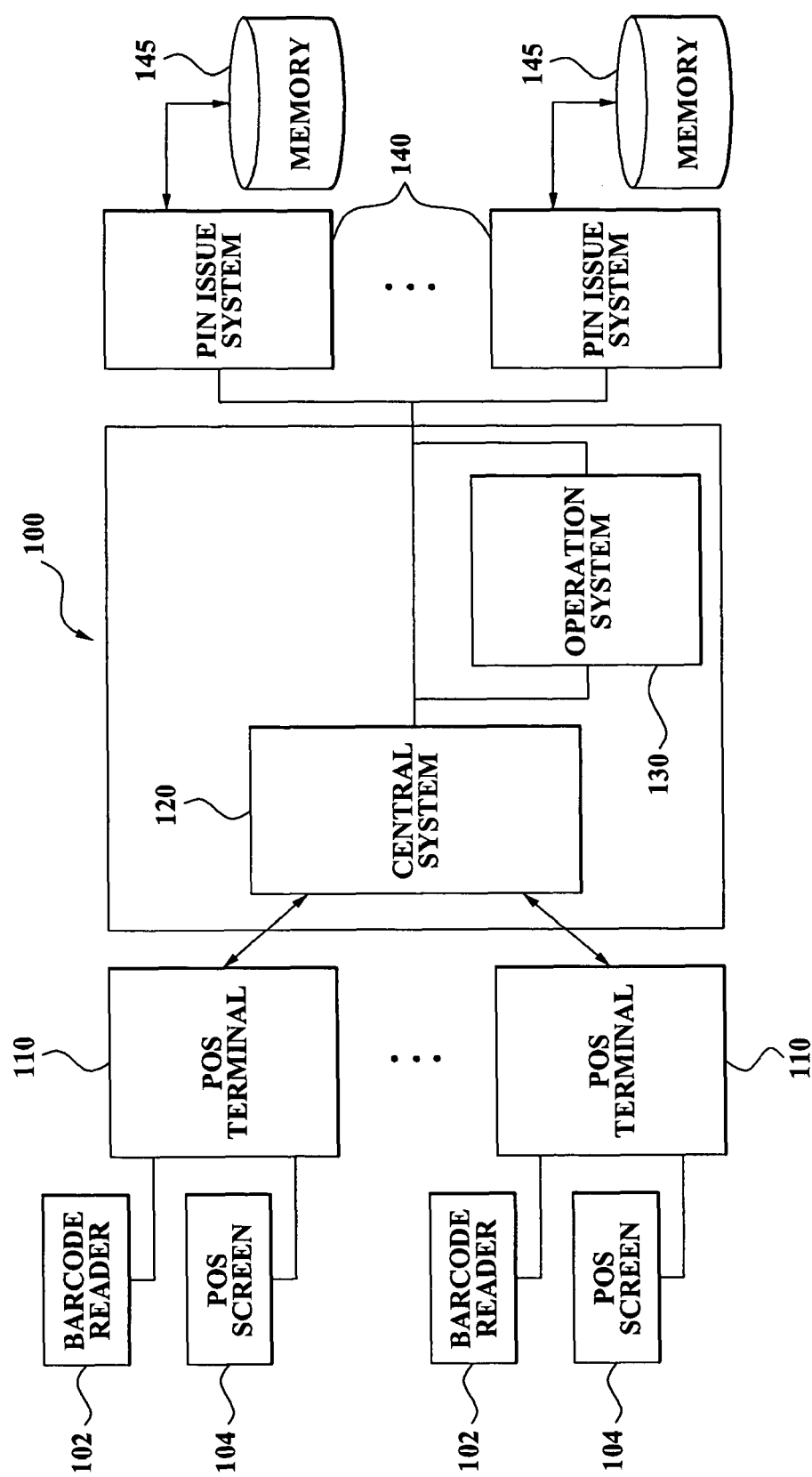
FIG. 1 is a configuration diagram illustrating a prepaid card management system according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

A personal identification number (PIN) used throughout the present specification is a number which enables a user to receive a predetermined service within an amount of prepaid money. As an example, when the service is associated with a phone connection service, the user may receive the phone connection service for a time corresponding to the amount of prepaid money utilizing the PIN. When issuing the PIN, the PIN may be printed out on a plastic card and provided to the user. In this instance, it takes a certain amount of time to print out the PIN on the plastic card. In the present embodiment, it is described that the PIN is assigned and, at the same time, issued on a piece of paper in real time. In this case, an issue cost is inexpensive. Also, an individual card identification code may include a combination of numbers and characters which are identical to a management number.

The PIN may be constructed of a predetermined number of ciphers according to a number generation system of a corresponding affiliated prepaid card company. While the PIN is defined as a 'number' in the present embodiment, the present invention is not limited thereto. The PIN may be constructed of a combination of languages, special characters, special symbols, etc.

Also, as the service is provided for the user, an amount of money, i.e. a balance, associated with the PIN may be reduced. When the amount of money falls below a certain value, the user may be required to recharge the prepaid card.

In particular, the prepaid card management system of the present invention issues a PIN according to a request for purchasing a prepaid card. Also, the prepaid card management system may include an operation system that manages a plurality of PIN issue systems so as to guarantee that a plurality of affiliated prepaid card companies adjustably assign PINs, and thus comprehensively manage the plurality of affiliated prepaid card companies. Accordingly, users may utilize various prepaid cards.

FIG. 1 is a configuration diagram illustrating a prepaid card management system 100 according to an embodiment of the present invention.

The prepaid card management system 100 according to the present embodiment may include a central system 120 and an operation system 130. The central system 120 groups and connects a predetermined number of POS terminals 110 or POS terminals 110 which are positioned in a particular area. The operation system 130 manages PIN issue systems 140 of various affiliated prepaid card companies, i.e. issuing companies of prepaid cards, and transmits a card request signal or a card charging request signal to the particular PIN issue system 140 according to a type of a prepaid card which is requested to be issued or charged from the POS terminal 110. In this instance, the POS terminals 110 may designate terminals that are installed in various distribution stores, e.g. convenient stores, prepaid card agencies, etc. Also, the PIN issue system 140 may indicate a PIN issue unit of an affiliated prepaid card company which maintains a connection with the central system 120 or the operation system 130, issues the PIN according to a request for issuing the PIN, and transmits the issued PIN to the POS terminal 110 via the central system 120.

In the present embodiment, the prepaid card management system 100 includes only the central system 120 and the operation system 130. Depending upon system environments, the prepaid card management system 100 may include the POS terminal 110 and the PIN issue system 140.

When a request for purchase of the prepaid card is received from the user, i.e. a purchaser who requests a purchase of the prepaid card, the POS terminal 110 functions to generate affiliated prepaid card company information, card type information, and amount information associated with the prepaid card. Namely, with respect to a particular prepaid card that the user desires to purchase, the POS terminal 110 generates affiliated prepaid card company information, card type information, and amount information associated with the prepaid card in the connected operation system 130 via the central system 120, so as to make the prepaid card identifiable.

The affiliated prepaid card company information, the card type information, and the amount information associated with the prepaid card may be generated by readers such as a barcode reader 102 and a POS screen 104. The readers are provided in the POS terminal 110, and recognize information on an affiliated prepaid card company which provides a prepaid card requested to be purchased, a type of the prepaid card, and an amount of money of the prepaid card. In this instance, the readers may include the barcode reader 102 and the POS screen 104. The barcode reader 102 generates affiliated prepaid card company information, card type information, and amount information by reading a barcode sheet including a card product code or a redemption value code of at least one prepaid card. The POS screen 104 displays the card product code or the redemption value code on a predetermined screen utilizing an icon, and generates affiliated prepaid card company information, card type information, and amount information by having the displayed icon selected. The POS terminal 110 may use RFID technology to recognize information on the affiliated prepaid card company, the type of the prepaid card and the amount of money of the prepaid card.

In particular, the POS screen 104 may be manufactured in a form of a touch screen that generates the affiliated prepaid card company information, the card type information, and the amount information as a user of the POS terminal 110, e.g. a sales clerk, inputs a card product code or a redemption value code associated with the prepaid card utilizing the touch screen.

The barcode sheet including the card product code or the redemption value code may include an output copy printed with a barcode of the prepaid card that is obtained via a PC, an advertising print having a barcode printed on a predetermined promotion brochure, e.g. a magazine and a book, and a barcode image displaying a barcode obtained in a predetermined portable device communication environment on a predetermined display unit. Also, the barcode reader 102 may generate affiliated prepaid card company information, card type information, and amount information of a particular prepaid card by reading various types of barcodes as described above.

A method of generating the affiliated prepaid card company information, the card type information and the amount information of the prepaid card may be different according to a business environment of each store. As an example, the affiliated prepaid card company information and the card type information may be generated by reading the card product code from the barcode sheet via the barcode reader 102. Also, the amount information may be generated by touching or selecting an image associated with the redemption value code in a keyboard of the POS screen 104.

As another example, the affiliated prepaid card company information, the card type information, and the amount information may be generated by reading the card product code and the redemption value code from the barcode sheet via the barcode reader 102. Also, the affiliated prepaid card company information, the card type information, and the amount information may be generated by inputting an image associated with the card product code and the redemption value code in the POS screen 104.

Namely, the POS terminal 110 generates the affiliated prepaid card company information, the card type information, and the amount information which can identify the prepaid card requested by the user, and transmits the generated information to the central system 120, so that the PIN issue system 140 may issue a PIN associated with the affiliated prepaid card company information, the card type information, and the amount information.

Also, the POS terminal 110 prints out PIN information issued according to the user's request for purchase of the prepaid card, so that the PIN information may be provided to the user. In the present embodiment, the POS terminal 110 prints out the PIN information, which includes the PIN issued in the PIN issue system 140, in a form of a piece of paper. Also, the PIN information may include card type information, available balance information, available period information, utilization guide information, etc., in addition to the PIN. Accordingly, the PIN information may help a user to easily utilize the prepaid card.

The central system 120 is a device which groups and manages at least one POS terminal 110 and manages sales, stocks, etc., in a store where the at least one POS terminal 110 is positioned. In the present invention, the central system 120 functions to receive affiliated prepaid card company information, card type information, and amount information from the POS terminal 110, generate a card request signal by including a transaction number in the received information from the POS terminal 110, and notify the operation system 130 that a request for purchase of the prepaid card is received. In this instance, the operation system 130 functions to receive the card request signal.

Namely, the central system 120 adds the transaction number, i.e. a transaction identification number, for later settlement, to information transmitted from the POS terminal 110 and thus, transmits the added information to the POS terminal 110.

Also, when a transaction such as a request for a prepaid card is generated, the central system 120 extracts amount information from the information received from the POS terminal 110 or receives the amount information inputted via a keyboard, generates the transaction number, stores the same and later settles. As an example, the central system 120 receives product/service information, which is received from a particular key signal of the POS terminal 110 pressed when a clerk starts a service or from a particular part of information in a transmitted barcode, and also recognizes amount information which is recognized from inputted information according to a screen instruction when a clerk performs a service or from a particular part of a barcode. The central system 120 generates a transaction number in each inputted information, and matches and stores the each generated transaction number with each inputted information. Also, the central system 120 utilizes the stored information for a later settlement. The generated transaction number is transmitted to the operation system 130 with the entire information received from the POS terminal 110.

Also, in response to the generated card request signal, the central system 120 may transmit the PIN information received from the PIN issue system 140 to the POS terminal 110.

Also, the card request signal transmitted from the central system 120 includes affiliated prepaid card company information which is received from the POS terminal 110. Accordingly, the operation system 130 may designate the particular PIN issue system 140 to transmit the card request signal utilizing the affiliated prepaid card company information.

The operation system 130 functions to identify the PIN issue system 140 of a particular affiliated prepaid card company from the affiliated prepaid card company information and transmit the card request signal to the identified PIN issue system 140. The affiliated prepaid card company information may include a provider of the prepaid card, a brand of the prepaid card, etc. Namely, the operation system 130 recognizes information on an affiliated prepaid card company which has a right to issue the PIN with respect to the prepaid card requested for purchase, from the affiliated prepaid card company information, and transmits the card request signal to the PIN issue system 140 of the affiliated prepaid card company in a predetermined format. The operation system 130 may be connected to a plurality of PIN issue systems 140. Also, among the plurality of PIN issue systems 140, the operation system 130 may determine the particular PIN issue system 140 designated by the affiliated prepaid card company information, as the PIN issue system 140 to receive the card request signal.

Each of the PIN issue systems 140 is managed by each affiliated prepaid card company and receives the card request signal which is transmitted from the operation system 130. As described above, the card request signal may be selectively transmitted to the particular PIN issue system 140 designated by the affiliated prepaid card company information.

Also, in response to the transmitted card request signal, the PIN issue system 140 generates PIN information and transmits the generated PIN information to the POS terminal 110 via the central system 120 or the operation system 130.

A method of generating PIN information in the PIN issue system 140 may be arbitrarily determined according to a system environment of the PIN issue system 140. As an example, the PIN issue system 140 may pre-generate a plurality of PINs, maintain the generated plurality of PINs in a memory 145 and extract a PIN corresponding to a card request signal from the memory 145. Also, the PIN issue system 140 may generate a PIN upon receipt of the card request signal, without pre-generating the PIN.

Initially, in a method of pre-generating a PIN, the PIN issue system 140 maintains the pre-generated PIN in the memory 145 to correspond to a card type identifier and a redemption value identifier. In this instance, the card type identifier and the redemption value identifier may be set by an affiliated prepaid card company. The card type identifier relates to a type of the prepaid card which is requested for purchase. Also, the redemption value identifier relates to an amount of money of the prepaid card which is requested for purchase. When the PIN identified with the card type identifier and the redemption value identifier is maintained in the memory 145, the PIN issue system 140 may search the memory 145 for a single PIN which belongs to a group of the card type identifier and the redemption value identifier matched with the received card request signal. Next, the PIN issue system 140 may include the retrieved PIN in PIN information, to be transmitted to the POS terminal 110.

In another method of pre-generating a PIN, the PIN issue system 140 may maintain the pre-generated PIN in the memory 145 to correspond to a card type identifier and a redemption value identifier with an amount of '0, won'. When a card request signal is received, the PIN issue system 140 may extract an arbitrary PIN which belongs to a group of the card type identifier matched with the card request signal, from the memory 145. Namely, the PIN issue system 140 extracts any one of the pre-generated PINs and increases, i.e. credits, an amount value of the extracted PIN to amount information included in the card request signal. Accordingly, it is possible to decrease a probability that a corresponding PIN may not be provided since PINs having a redemption value corresponding to the card request signal are not pre-generated. Through this, an adjustable issue of the PIN may be guaranteed. The PIN information transmitted to the POS terminal 110 may include the extracted PIN and the amount information.

Also, in a method of not pre-generating a PIN, the PIN issue system 140 may issue a PIN in real time according to a particular algorithm, in interoperation with receiving of a card request signal, and considering card type information associated with the card request signal.

FIGS. 2 and 3 are diagrams illustrating an example of issuing a PIN according to the present invention. FIG. 2 illustrates network address information of the PIN issue system 140 associated with an affiliated prepaid card company, which is managed in the operation system 130. FIG. 3 illustrates a PIN maintained in the memory 145.

A user, e.g. a sales clerk, of the POS terminal 110 who has received a request to purchase of a prepaid card from a user may manipulate the POS terminal 110 and generate information on a type of the prepaid card and an amount of money of the prepaid card. For this, the POS terminal 110 may generate affiliated prepaid card company information, card type information, and amount information by reading a barcode sheet including a card product code and a redemption value code of the prepaid card via the barcode reader 102 or the POS screen 104 which displays an image associated with the card product code and the redemption value code of the prepaid card on the screen.

As an example, when a request for purchasing 10,000, won of 'dokdolovecard' which is a prepaid card of an A company is received from a user, the POS terminal 110 may read the card product code associated with the 'dokdolovecard' of the A company from the barcode sheet or select the image associated with the card product code in the POS screen 104, to thereby generate affiliated prepaid card company information 'A' and card type information 'dokdolovecard'. In addition, the POS terminal 110 may generate amount information associated with '10,000, won' by reading the redemption value code associated with '10,000, won' from the barcode sheet via the barcode reader 102 or selecting the image associated with the redemption value code in the POS screen 104.

The generated affiliated prepaid card company information 'A' and the card type information 'dokdolovecard', and the amount information '10,000, won' are transmitted to the central system 120 connecting the POS terminals 110.

The central system 120 generates a transaction number and provides the operation system 130 with the transaction number and the information transmitted from the POS terminal 110.

The operation system 130 recognizes the affiliated prepaid card information 'A' from the card request signal received from the central system 120, identifies the PIN issue system 140 associated with the affiliated prepaid card company 'A' and transmits the card request signal to the identified PIN issue system 140. Namely, the operation system 130 may identify the PIN issue system 140 associated with the affiliated prepaid card company 'A' from the plurality of PIN issue systems 140 and transmit the card request signal to the identified PIN issue system 140. For this, as shown in FIG. 2, the operation system 130 may maintain network address information of the PIN issue system 140 corresponding to the affiliated prepaid card company 'A'. Also, the operation system 130 may identify a network address of the particular PIN issue system 140 to receive the card request signal, and utilize the network address information. In the above-described example, the operation system 130 may recognize the network address of the PIN issue system 140 associated with the affiliated prepaid card company 'A' as 'IP:130.36.1.86' and transmit the card request signal to the PIN issue system 140 of the recognized network address.

The PIN issue system 140 associated with the affiliated prepaid card company 'A' which receives the card request signal may extract, from the memory 145, or generate the PIN corresponding to the card type information 'dokdolovecard' and the amount information '10,000, won' of the prepaid card requested for purchase. Also, the PIN issue system 140 may include the extracted PIN in PIN information. Next, the PIN issue system 140 may transmit the PIN information to the POS terminal 110 via the central system 120 or the operation system 130, so that the PIN may be printed out on an output copy, e.g. a receipt paper, of the POS terminal 110 and provided for the user.

In this instance, the PIN issue system 140 may generate PIN information utilizing various methods according to a system environment. A method of pre-generating a PIN and maintaining the PIN in the memory 145 will be described.

The PIN issue system 140 associated with the affiliated prepaid card company 'A' generates a PIN according to a particular algorithm depending upon a type of the prepaid card, and stores a redemption value to correspond to each PIN in the memory 145, as shown in a part i) of FIG. 3. When the card request signal is received from the operation system 130, the corresponding PIN issue system 140 may retrieve a PIN 'd48283010', corresponding to a card type identifier 'Dokdo' matched with the type of the prepaid card 'dokdolovecard' and the redemption value identifier '10,000, won' matched with an amount of the prepaid card '10,000, won', and extract the retrieved PIN from the memory 145.

Also, as another method of generating PIN information, the PIN issue system 140 may generate a PIN for each type of prepaid card according to an algorithm, make the redemption value of the each type of prepaid card as '0, won' and store the generated PIN in the memory 145, as shown in a part ii) of FIG. 3. Next, the PIN issue system 140 may retrieve the card type identifier 'Dokdo' matched with the type of the prepaid card 'dokdolovecard', and extract any one of a plurality of PINs corresponding to the card type identifier 'Dokdo'. Next, the PIN issue system 140 may increase, i.e. credit, a redemption value corresponding to the extracted PIN to amount information of the card request signal, i.e. to the amount of money of the prepaid card, '10,000, won', and include the increased redemption value as the PIN information. Namely, the PIN information generated in the PIN issue system 140 may include an arbitrarily selected PIN, e.g. 'd68231004', , and amount information '10,000, won'.

As described above, according to the preset invention, it is possible to issue various PINs of prepaid cards which are being serviced by various affiliated prepaid card companies. Accordingly, when purchasing a prepaid card, a user may not need to move from one store to another store according to the type of the prepaid card. Also, a large variety of prepaid cards may be sold by providing various prepaid cards by comprehensively managing affiliated prepaid card companies.

An activation of corresponding PIN information to provide a user with a substantial service utilizing generated PIN information will be described.

The PIN issue system 140 may store prepaid card transmission particulars associated with the PIN information transmitted to the POS terminal 110. The POS terminal 110 may print out the PIN information and provide the same for the user. In this instance, the POS terminal 110 may generate an activation request signal about the PIN information in interoperation with the output of the PIN information, i.e. issue of the PIN, and transmit the generated activation request signal to the PIN issue system 140 via the central system 120 and the operation system 130. Accordingly, the PIN issue system 140 may determine whether the PIN information requested to be activated is normally issued. Only when normally issued, the PIN issue system 140 may activate, i.e. approve, a right to use the prepaid card corresponding to the PIN information.

When the PIN information requested to be activated is not normally issued, the PIN issue system 140 maintains restrictions, such as a utilization limit which is applied to the corresponding PIN information, so that a substantial service may not be provided for the user.

In the present embodiment, the request for activating the PIN information is generated at the same time when the PIN information is printed out. However, the present invention is not limited thereto. Various methods may be included, e.g. a method of generating a request for activating PIN information when a user desires to receive a substantial service and transmitting the generated activation request to the PIN issue system 140 via a portable device.

Accordingly, the user may receive various prepaid card services, e.g. making a call, utilizing the activated PIN information and also continuously receive the service within the balance associated with the PIN information.

Also, increasing the balance associated with PIN information in response to a request for recharging a prepaid card from a user will be described.

A unique PIN, a management number, etc., are generally assigned to each prepaid card which is issued in an affiliated prepaid card company. In the present embodiment, additionally assigning a unique individual card identification code to the prepaid card will be described.

In the present embodiment, each prepaid card may include the individual card identification code and the affiliated prepaid card company information in a form of a barcode. Accordingly, when a user of the prepaid card desires to increase, i.e. recharge, an available amount of money with respect to the prepaid card, the POS terminal 110 may read such barcode information, and input and transmit requested recharging amount information to the central system 120, in response to the user's request for recharging the prepaid card.

The central system 120 receives the affiliated prepaid card company information, the individual card identification code and the recharging information, generates a transaction number and transmits the generated transaction number and the received information to the operation system 130 with a card recharging request signal.

The operation system 120 extracts the affiliated prepaid card company information from the card recharging request signal, identifies the associated PIN issue system 140, and transmits the card recharging request signal to the identified PIN issue system 140 in a predetermined format. Generation of the card recharging request signal and identification of the PIN issue system 140 associated with the affiliated prepaid card company will be performed by a similar method to the aforementioned process of issuing the prepaid card. Accordingly, detailed description related thereto will be omitted herein.

In response to the transmitted card recharging request signal, the PIN issue system 140 increases the balance information, which is stored in correspondence to the individual card identification code, by an amount of money corresponding to the recharging information. Also, the PIN issue system 140 transmits an affirmative recharging message to the POS terminal 110 via the central system 120 and the operation system 130. In this instance, the affirmative recharging message is generated according to an increase in the balance information. In the present embodiment, the affirmative recharging message is transmitted to the POS terminal 110 receiving the recharging request from the user, but the present invention is not limited thereto. Also, the central system 120 may notify the user's portable device that the prepaid card has been recharged utilizing a text message/mail/speech message, etc.

Also, in a prepaid card charging method according to another embodiment of the present invention, when the operation system 130 maintains a unique card management number corresponding to each PIN, the operation system 130 may retrieve the card management number corresponding to each individual card identification code and generate a card recharging request signal utilizing the retrieved card management number and the recharging information. Next, the operation system 130 transmits the card recharging request signal including the card management number to the identified PIN issue system 140 by utilizing the affiliated prepaid card company information. In this instance, the card management number is a number which each affiliated prepaid card company assigns to each PIN for easy sales management.

Accordingly, the PIN issue system 140 that receives the card management number may omit a card management number retrieval process utilizing the individual card identification code. Also, each PIN issue system 140 may not need to maintain a predetermined database storing the individual card identification code of each prepaid card. Accordingly, the each prepaid card may be rapidly and systematically issued.

As described above, according to the present invention, it may be possible to satisfy a request for recharging a prepaid card from a user who desires to utilize more than an available amount of money which is pre-set in the prepaid card.

Figure 4:
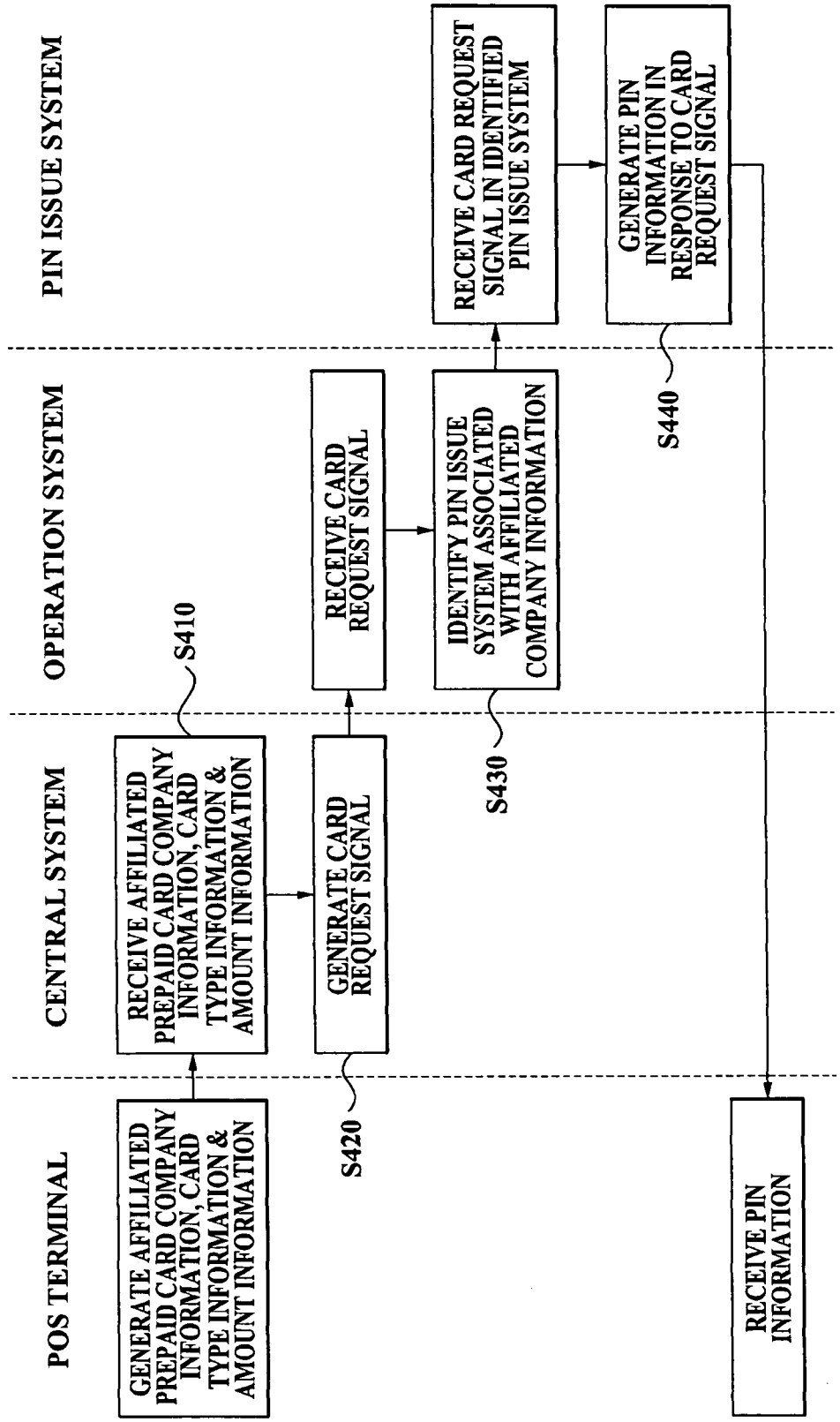
FIG. 4 is a flowchart illustrating a prepaid card management method according to an embodiment of the present invention.

FIG. 4 is a flowchart illustrating a prepaid card management method according to an embodiment of the present invention.

The prepaid card management method according to the present embodiment may be performed by the prepaid card management system 100. In this instance, the prepaid card management system 100 is connected to the POS terminals 110 and the PIN issue systems 140, and also includes the central system 120 and the operation system 130.

In operation S410, the central system 120 receives affiliated prepaid card company information, card type information and amount information from the POS terminal 110. In operation S410, when a request for purchasing a particular prepaid card is received from a user, the central system 120 receives the affiliated prepaid card company information, the card type information and the amount information which are obtained and generated by the reader 102 or the POS screen 104 of the POS terminal 110.

In operation S420, the central system 120 generates a transaction number and provides the operation system 130 with the generated transaction number and the received information from the POS terminal 110.

In operation S430, the operation system 130 extracts the affiliated prepaid card company information from the information which is received from the central system 120, identifies the PIN issue system 140 associated with the prepaid card requested to be purchased and transmits the card request signal to the identified PIN issue system 140 according to a predetermined format. Operation S430 is a process of recognizing the particular PIN issue system 140 capable of issuing the prepaid card requested to be purchased, from the plurality of PIN issue systems 140 accessing the operation system 130, and transmitting the card request signal to the PIN issue system 140 of the corresponding affiliated prepaid card company.

In operation S440, in response to the transmitted card request signal, the PIN issue system 140 generates PIN information and transmits the generated PIN information to the POS terminal 110 via the central system 120 and the operation system 130. Operation S440 is a process of the PIN issue system 140 additionally generating a PIN according to receipt of the card request signal or extracting a PIN, which is pre-generated and maintained in the memory 145, from the memory 145 and including the extracted PIN in PIN information. The generated PIN information is transmitted to the POS terminal 110 in a store where the user requested a purchase of the prepaid card, via the central system 120 and the operation system 130 which are connected to the PIN issue system 140. Next, the POS terminal 110 may print out the received PIN information utilizing an output material, e.g. a paper, and issue the prepaid card in a form so that the user can identify the PIN.

As described above, according to the present invention, although a PIN generation system of each affiliated prepaid card company is different, the PIN may be adaptably issued by including the operation system 130 which comprehensively manages issuance of prepaid cards of various affiliated prepaid card companies.

Also, when a request for recharging the issued PIN is received from the user, the prepaid card management system 100 may increase balance information of a corresponding PIN to recharging information by utilizing the recharging information and the individual card identification code transmitted from the POS terminal 110. In this instance, the operation system 130 may maintain a card management number which is generated by an affiliated prepaid card company corresponding to the individual card identification code. The operation system 130 may identify a prepaid card to be recharged, as a proxy. Accordingly, a process of recharging the prepaid card may be rapidly performed in the PIN issue system 140.

Also, when a request for activating the issued PIN information is received, the prepaid card management system 100 may release a utilization limit with respect to only a normally issued PIN by referring to prepaid card transmission particulars. In the present embodiment, a point in time when the activation request is generated is not particularly limited. The point in time may be a point in time when the PIN information is printed out in the POS terminal 110, i.e. a point in time when the PIN is substantially provided for the user.

The prepaid card management method according to the above-described embodiments of the present invention may be recorded in computer-readable media including program instructions to implement various operations embodied by a computer. The computer-readable media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Other media may include a transmission medium such as optical or metallic lines, wave guides, etc. that can transmit a carrier wave transmitting signals specifying the program instructions, data structures, etc. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

According to the present invention, there is provided a prepaid card management method and system which can adaptably issue PINs of prepaid cards of various affiliated prepaid card companies by including an operation system to comprehensively manage a plurality of PIN issue systems.

Also, according to the present invention, there is provided a prepaid card management method and system which can prevent any overlap between PIN generation systems by securing each PIN generation system of each prepaid card company and transmitting a card request signal to a PIN issue system associated with an affiliated prepaid card company receiving a purchase request from a user.

Also, according to the present invention, there is provided a real-time prepaid card management method and system which can prevent an illegal utilization of a prepaid card by providing a user with a PIN issued from each prepaid card generation system according to the user's purchase request and activating only a normally issued PIN.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A prepaid card management method comprising:
   a central system receiving affiliated prepaid card company information, card type information, and amount information, from a POS terminal;
   the central system generating a card request signal which includes a transaction number in the information received from the POS terminal and providing the generated card request signal to a predetermined operation system;
   the operation system extracting the affiliated prepaid card company information from the information received from the central system, to identify a personal identification number (PIN) issue system associated with the prepaid card from a plurality of PIN issue systems and transmit the card request signal to the identified PIN issue system according to a predetermined format; and
   the operation system transmitting PIN information, which includes a PIN received from the PIN issue system in response to the transmitted card request signal, to the POS terminal via the central system,
   wherein the PIN issue system generates the PIN information by retrieving the PIN corresponding to the card request signal, and transmits the generated PIN information to the operation system.

2. The method of claim 1, wherein:
   the affiliated prepaid card company information and card type information are generated by a barcode reader of the POS terminal reading a card product code from a predetermined barcode sheet; and
   the amount information is generated by a keyboard of the POS terminal.

3. The method of claim 1, wherein the affiliated prepaid card company information, the card type information, and the amount information are generated by a barcode reader of the POS terminal reading a card product code and a redemption value code from a predetermined barcode sheet.

4. The method of claim 1, wherein the affiliated prepaid card company information, the card type information and the amount information are generated by keying a card product code and a redemption value code in a POS screen of the POS terminal.

5. The method of claim 1, wherein the PIN issue system retrieves the PIN included in the PIN information by performing:
   maintaining a memory recording a PIN corresponding to a predetermined card type identifier and a redemption value identifier; and
   extracting an arbitrary PIN corresponding to the card type identifier and the redemption value identifier identified with the transmitted card request signal, from the memory.

6. The method of claim 1, wherein the PIN issue system retrieves the PIN included in the PIN information by performing:
   maintaining a memory recording a PIN corresponding to a predetermined card type identifier; and
   extracting a single PIN corresponding to the card type identifier identified with the transmitted card request signal, from the memory.

7. The method of claim 1, wherein the PIN issue system retrieves the PIN included in the PIN information by performing:
   maintaining a memory recording a PIN corresponding to a predetermined card type identifier and having an amount value of 0;
   extracting a single PIN corresponding to the card type identifier identified by the transmitted card request signal, from the memory; and
   updating an amount value of the extracted PIN to an amount value associated with the card request signal.

8. The method of claim 1, wherein the PIN issue system generates the PIN according to a PIN generation algorithm.

9. The method of claim 1, wherein the POS terminal prints out the received PIN information using a predetermined printer.

10. The method of claim 1, wherein the PIN issue system stores a particular predetermined prepaid card transmission in association with the PIN information transmitted to the POS terminal, and activates a right to use the prepaid card by referring to the particular prepaid card transmission, when a request for activating the PIN information is received via the operation system.

11. A prepaid card management method comprising:
    a central system receiving affiliated prepaid card company information, an individual card identification code, and recharging information from a POS terminal;
    the central system generating a card recharging request signal which includes a transaction number in the information received from the POS terminal, and providing the generated card recharging request signal to a predetermined operation system;
    the operation system extracting the affiliated prepaid card company information from the information received from the central system, to identify a PIN issue system associated with the prepaid card from a plurality of PIN issue systems, and transmit the card recharging request signal to the identified PIN issue system according to a predetermined format; and
    the operation system transmitting a predetermined affirmative recharging message which is received from the PIN issue system in response to the transmitted card recharging request signal, to the POS terminal via the central system,
    wherein the PIN issue system retrieves the PIN corresponding to the card recharging request signal and increases balance information associated with the retrieved PIN by an amount corresponding to the recharging information.

12. A prepaid card management method comprising:
    maintaining a card management number corresponding to an individual card identification code in a predetermined operation system;
    a central system receiving affiliated prepaid card company information, the individual card identification code, and charging information from a POS terminal, and providing the received information to the operating system;
    the operation system retrieving the card management number corresponding to the individual card identification code and generating a card charging request signal, which includes the retrieved card management number, and the charging information;
    the operation system identifying a PIN issue system associated with the prepaid card utilizing the affiliated prepaid card company information from a plurality of PIN issue systems and transmitting the card charging request signal to the identified PIN issue system; and
    the operation system transmitting a predetermined affirmative charging message which is received from the PIN issue system in response to the transmitted card charging request signal, to the POS terminal via the central system, wherein the PIN issue system, in response to the card charging request signal, increases balance information, which is stored in correspondence to the card management number, by an amount corresponding to the charging information.

13. A computer-readable recording medium storing a program for implementing a prepaid card management method comprising:

a central system receiving affiliated prepaid card company information, card type information, and amount information, from a POS terminal;

the central system generating a card request signal which includes a transaction number in the information received from the POS terminal and providing the generated card request signal to a predetermined operation system;

the operation system extracting the affiliated prepaid card company information from the information received from the central system, to identify a PIN issue system associated with the prepaid card from a plurality of PIN issue systems and transmit the card request signal to the identified PIN issue system according to a predetermined format; and the operation system transmitting PIN information, which includes a PIN received from the PIN issue system in response to the transmitted card request signal, to the POS terminal via the central system, wherein the PIN issue system generates the PIN information, by retrieving the PIN corresponding to the card request signal, and transmits the generated PIN information to the operation system.

14. A prepaid card management system comprising:

a central system which receives affiliated prepaid card company information, card type information, and amount information and provides a card request signal including a transaction number in the received information, to a predetermined operation system; and an operation system which extracts the affiliated prepaid card company information from the information received from the central system, to identify a PIN issue system associated with the prepaid card from a plurality of PIN issue systems and to transmit a card request signal to the identified PIN issue system according to a predetermined format, and transmits the PIN information including a PIN received from the PIN issue system in response to the transmitted card request signal, to the POS terminal via the central system, wherein the PIN issue system generates the PIN information by retrieving the PIN corresponding to the card request signal, and transmits the generated PIN information to the operation system.

15. A prepaid card management system comprising:

a central system which receives affiliated prepaid card company information, an individual card identification code and charging information from a predetermined POS terminal, generates a card charging request signal including a transaction number in the information received from the POS terminal, and provides the generated card charging request signal to a predetermined operation system; and an operation system which extracts the affiliated company information from the information received from the central system, to identify a PIN issue system associated with the prepaid card from a plurality of PIN issue systems and transmit the card charging request signal to the identified PIN issue system according to a predetermined format, transmits a predetermined affirmative charging message which is received from the PIN issue system in response to the transmitted card charging request signal, to the POS terminal via the central system, wherein the PIN issue system retrieves the PIN corresponding to the card charging request signal and increases balance information associated with the retrieved PIN by an amount corresponding to the charging information.

* * * * *